United States Patent [19]

Harding

[11] Patent Number: 4,632,140

[45] Date of Patent: Dec. 30, 1986

[54] TOP ENTRY BALL VALVE

[75] Inventor: Bruce L. Harding, Holden, Mass.

[73] Assignee: Smith Valve Corporation, Westboro, Mass.

[21] Appl. No.: 777,290

[22] Filed: Sep. 18, 1985

Related U.S. Application Data

[63] Continuation-in-part of Ser. No. 561,887, Dec. 15, 1983, Pat. No. 4,548,384.

[51] Int. Cl.$^4$ .............................................. F16K 5/06
[52] U.S. Cl. .................................... 137/315; 251/351; 285/363
[58] Field of Search ................ 215/315, 366; 137/315; 29/213 R, 213 E; 285/363; 251/162, 163

[56] References Cited

U.S. PATENT DOCUMENTS

| | | | |
|---|---|---|---|
| 1,109,126 | 9/1914 | Johnson | 251/366 |
| 1,112,820 | 10/1984 | McIsaac | 251/366 |
| 3,738,666 | 6/1973 | Adams | 251/366 |
| 4,164,343 | 8/1979 | Graebner | 251/315 |
| 4,403,795 | 9/1983 | Davlin | 285/363 |

*Primary Examiner*—Martin P. Schwadron
*Assistant Examiner*—Sheri M. Novack
*Attorney, Agent, or Firm*—Maurice E. Gauthier

[57] ABSTRACT

A ball valve has a valve body with a bonnet bore communicating with a through fluid bore. An unyielding valve seat is fixed in the valve body at a location surrounding the axis of the fluid bore. A bonnet with a stem bore extending therethrough is received in the bonnet bore. The bonnet is adjustable within the bonnet bore to shift the axis of the stem bore transversely with respect to the fluid bore axis. A stem is rotatably received in the stem bore. A ball with a passageway extending therethrough is carried by the stem and located in the through fluid bore. The center of the ball is offset with respect to the rotational axis of the stem. During initial assembly of the valve components, the ball is located in a closed position against the seat by selected adjustment of the bonnet in the bonnet bore coupled with rotation of the stem. The bonnet is then fixed in the bonnet bore. Thereafter, the ball may be operated between the closed position and an open position aligning its through passageway with the fluid bore by rotating the stem in the thus fixed bonnet.

12 Claims, 16 Drawing Figures

TOP ENTRY BALL VALVE

RELATED U.S. APPLICATION DATA

This application is a continuation-in-part of Ser. No. 561,887 filed Dec. 15, 1983, now U.S. Pat. No. 4,548,384, issued 10-22-85.

BACKGROUND OF THE INVENTION

1. Field of the Invention

This invention relates generally to ball valves and is concerned in particular with an improved top entry ball valve having an unyielding seat.

2. Description of the Prior Art

There exists a long felt and heretofore unsatisfied need for a quick-acting low-cost on-off valve having the capability of achieving ANSI (American National Standard Institute) pressure-temperture ratings. The conventional gate valve, with its metal-to-metal seating and wedging action, satisfies many of these requirements. However, because screw threads are used to force the wedging action, many turns of the valve operating handle are required to move the wedge between its fully open and fully closed positions. Thus, quick action becomes an impossibility with this type of valve.

Moderately priced ¼ turn ball valves also achieve many of the above-stated requirements. However, such valves lack the ability to achieve high pressure-temperature ratings because they employ yieldable elastomeric seats, whose pressure retaining capabilities drop rapidly as temperatures increase.

Metal-seated ball valves also are available which again achieve many but not all of the above-stated requirements. Because such valves require extremely precise machining and assembly, their costs are extremely high and this in turn severely limits where they can be used.

SUMMARY OF THE PRESENT INVENTION

A basic objective of the present invention is to provide a new and improved top-entry ball valve which has an unyielding seat (typically metallic), and which is quick-acting, low-cost, and capable of achieving ANSI pressure-temperature ratings. A related objective of the present invention is the provision of means for adjusting the relative positions of certain of the valve components during initial valve assembly in order to compensate for normal variations in manufacturing tolerances and to thereby ensure that, when closed, the valve ball is properly wedged into sealing engagement with the valve seat.

The foregoing objectives are achieved in preferred embodiments of the invention to be hereinafter described in greater detail by providing a ball valve having a body with a bonnet bore leading to a through fluid bore. A circular unyielding valve seat surrounds the fluid bore axis. A metal ball with a passageway extending therethrough is supported in the fluid bore by means of an operating stem. A bonnet in the bonnet bore has a stem bore in which the operating stem is journalled for ¼ turn rotation between a closed position at which the ball is in sealing engagement with the valve seat to block the fluid bore, and an open position at which the ball is spaced from the valve seat, with its through passageway aligned with the fluid bore.

The ball is eccentrically rotated between its open and closed positions. Eccentric rotation is achieved by offsetting the rotational axis of the operating stem from the center of the ball.

Eccentric rotation of the ball is accommodated by externally contouring the ball to provide adequate clearance from the body interior, the said contouring also forming an integral stop which is engageable with the valve body to positively locate the ball in its open position.

The bonnet is adjustable within the bonnet bore to shift the axis of the stem bore transversely with respect to the fluid bore axis. Thus, during assembly of the valve components, normal variations in manufacturing tolerances can be easily and inexpensively compensated for by adjusting the position of the bonnet within the bonnet bore and/or by rotating the stem in relation to the bonnet in order to achieve a precise seating of the ball against the unyielding seat. Once this precise seating is achieved, the bonnet is fixed in relation to the valve body.

These and other objectives and advantages of the present invention will now be described in greater detail in connection with the accompanying drawings, wherein:

DETAILED DESCRIPTION OF ILLUSTRATED EMBODIMENTS

Figure 1:
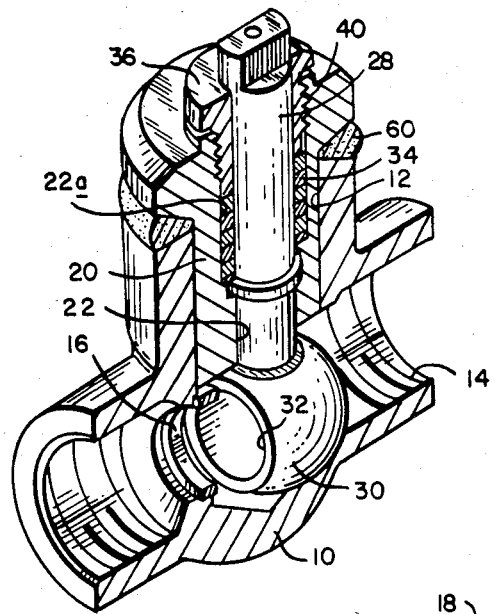
FIG. 1 is an isometric cross-sectional view of one embodiment of a valve in accordance with the present invention, with the ball in the open position.
Figure 2:
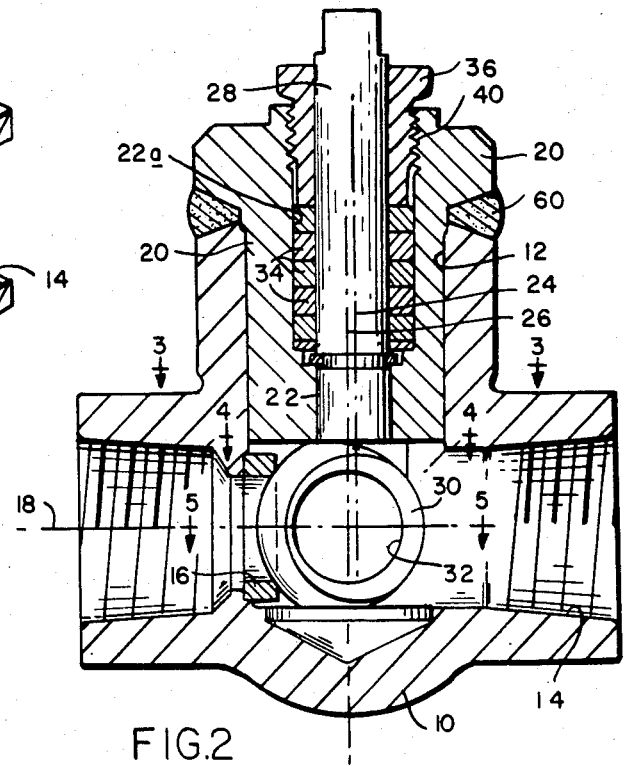
FIG. 2 is a vertical cross sectional view of the same valve, on an enlarged scale, showing the ball in the closed position.
Figure 3:
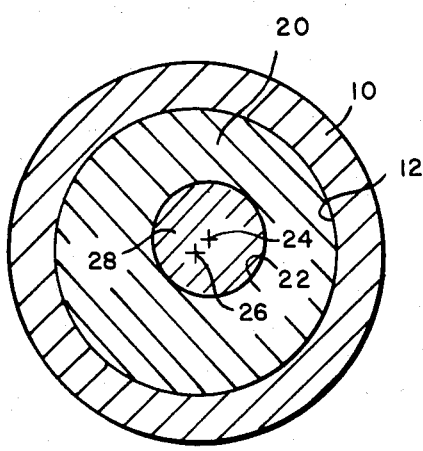
FIGS. 3 and 4 are horizontal sectional views taken respectively along lines 3—3 and 4—4 of FIG. 2.

Referring initially to FIGS. 1-5 of the drawings, one embodiment of a valve in accordance with the present invention is shown comprising a unitary body 10 having a bonnet bore 12 communicating with a through fluid bore 14. A circular unyielding valve seat 16 is arranged in the valve body at a location adjacent to the junction of the bonnet bore with the fluid bore. Typically, the valve seat will comprise a metal ring which can be fixed in place by any convenient method, such as for example brazing or swaging. However, under certain circumstances, such as for example when highly corrosive fluids are being handled, or where the fluids are at extremely high temperatures, it may be desirable to fabricate the valve seat and other associated components from non-metallic materials, e.g. ceramics. The valve seat surrounds the fluid bore axis, and the center line 18 of the valve seat is generally coincident with the fluid bore axis.

A bonnet 20 is received in the bonnet bore 12. The bonnet has a stem bore 22 extending therethrough, with the axis 24 of the stem bore being offset from the axis 26 of the bonnet bore (see FIG. 3).

An operating stem 28 is journalled for rotation in the stem bore 22. The rotational axis of the stem is coincident with the stem bore axis, and hence both will be designated in the drawings by the same reference numeral 24. The operating stem is integrally joined at its lower end to a ball 30 located in the fluid bore 14. The ball has a passageway 32 extending therethrough. The stem bore 22 has an enlarged diameter portion 22a containing annular packing elements 34 which are compacted by a packing gland 36 threaded as at 40 into the upper end of the bonnet 20. A handwheel or the like (not shown) may be connected to the upper end of the stem 28.

Figure 4:
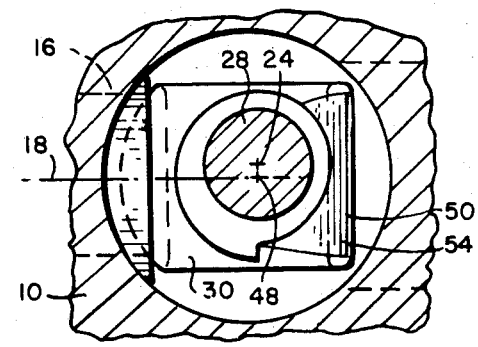

As can be best seen in FIG. 4, because of the offset of the ball center 48 from the stem axis 24, the ball will rotate eccentrically with respect to axis 24. To accommodate this offset rotation, the surface of the ball is contoured as at 50 to avoid interference with interior surfaces of the body 10. The contour 50 provides a stop 54.

Figure 5A:
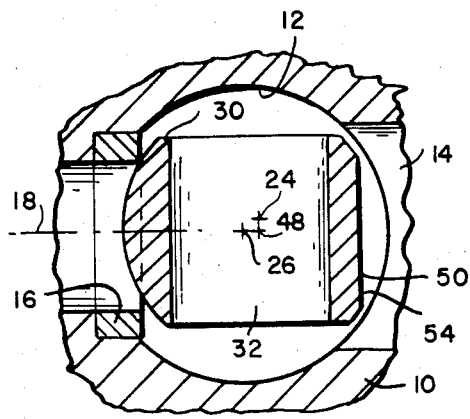
FIGS. 5A, 5B and 5C are horizontal sectional views taken along line 5—5 of FIG. 2 and respectively showing the ball in a misaligned and thus improperly closed position, a properly seated closed position, and a fully open position.
Figure 5B:
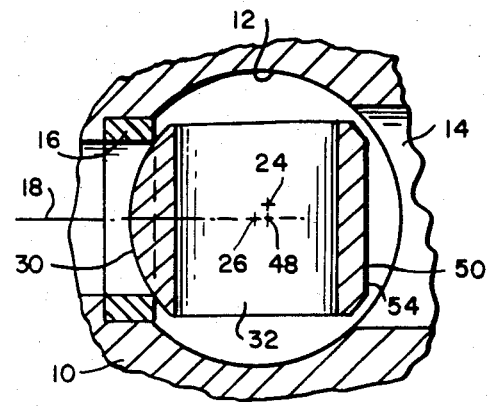
Figure 5C:
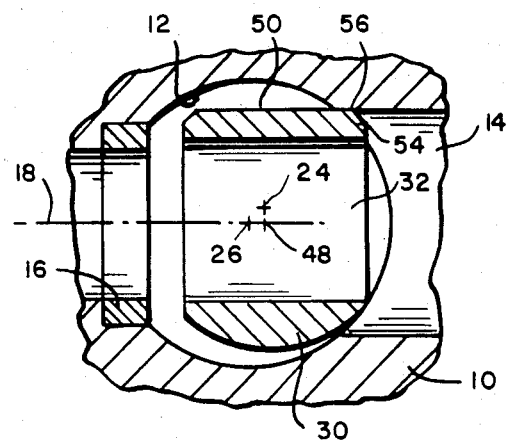

When the valve is open, as shown in FIGS. 1 and 5C, the ball 30 is spaced from the valve seat 16, with its through passageway 32 aligned with the fluid bore 14, and with the stop 54 engaging the valve body as at 56. The valve is closed by rotating the stem through a ¼ turn to eccentrically rotate the ball to the position best shown in FIGS. 2, 4 and 5B. The ball stop 54 is now spaced from the valve body and the ball is wedged into sealing engagement with the valve seat to block the fluid bore.

It thus will be seen that the valve can be rapidly operated between its fully closed and fully open positions by rotating the operating stem 28 in opposite directions through a ¼ turn. The ball 30 is positively located in the closed position by its wedged engagement with the valve seat 16, and in the open position by the engagement of stop 54 with the body at 56.

Because of variations by manufacturing tolerances, a situation might arise where the ball 30 would fail to seat properly against the valve seat 16 in the closed position. One such situation is shown in FIG. 5A, with the misalignment of the ball in relation to the seat being exaggerated for illustrative purposes. During initial assembly of the valve components, this misaligned condition can be corrected by rotating the bonnet 20 in the bonnet bore 12 and/or the stem 28 in the stem bore 22. By thus taking advantage of the dual offset relationships between the ball center 48 and stem axis 24 and between the stem axis and the bonnet bore axis 26, the ball 30 can be precisely seated against the metal seat 16, as shown in FIG. 5B. Once this has been accomplished, the bonnet 20 is fixed relative to the valve body 10, as by welding at 60. Thus, minor tolerance variations of valve components can be readily accommodated during initial assembly.

Several other valve constructions in accordance with the present invention are depicted in FIGS. 6-14. In these constructions, like reference numerals are used to identify features which are common to those of the valve construction depicted in FIGS. 1-5, and additional reference numerals are employed where appropriate to identify additional or modified features.

Figure 7:
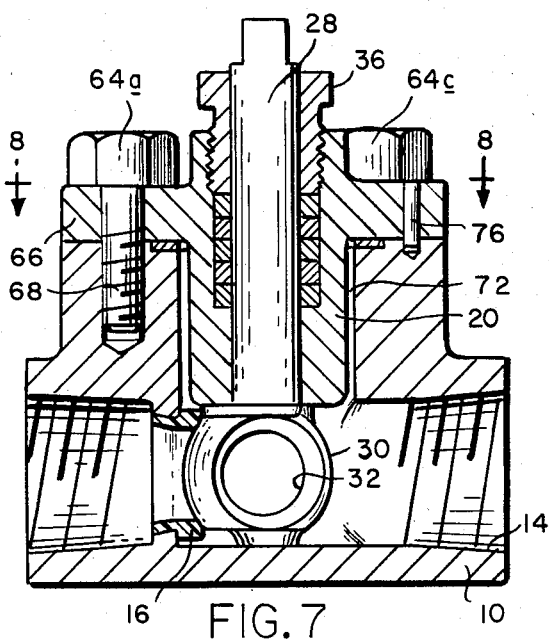
FIG. 7 is a vertical sectional view taken along line 7—7 of FIG. 6.
Figure 8:
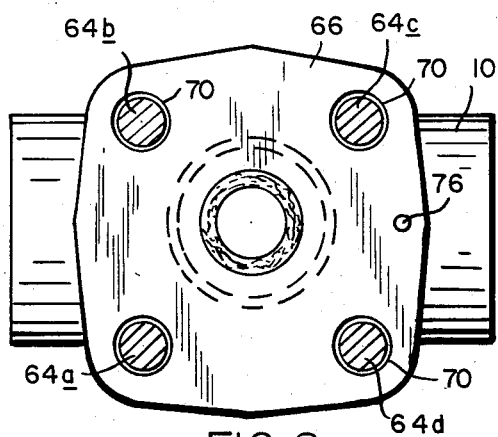
FIG. 8 is a horizontal sectional view taken along line 8—8 of FIG. 7.
Figure 6:
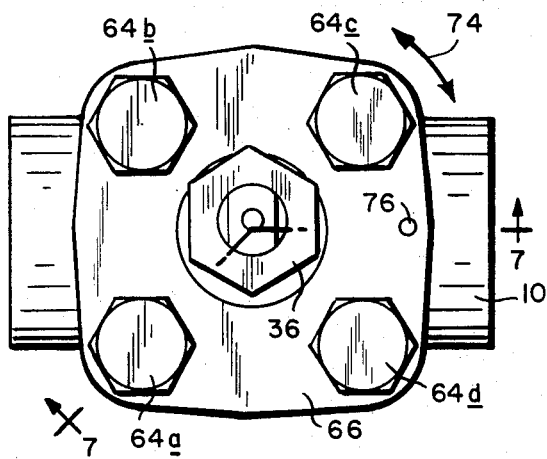
FIG. 6 is a top plan view, with portions broken away, of another embodiment of a valve in accordance with the present invention.

In the valve construction depicted in FIGS. 6, 7 and 8, the bonnet 20 is fixed in place by means of bolts $64_{a-d}$ which extend through holes in a bonnet flange 66 and which are threaded as at 68 into the valve body 10. The shank of bolt $64_a$ fits tightly in its flange hole, whereas the shanks of the remaining bolts $64_{c-d}$ are received with clearances 70 in their respective flange holes. A clearance 72 also exists between the barrel portion of the bonnet and the wall of the bonnet bore.

During assembly of the valve illustrated in FIGS. 6-8, the bolts $64_{a-d}$ are loosened, thereby allowing the bonnet 20 to pivot or swing as schematically depicted in FIG. 6 by arrow 74 about the axis of bolt $64_a$. The axis of bolt $64_a$ is located externally of the bonnet bore, is perpendicular to but displaced laterally from the fluid bore axis, and extends in a direction parallel to the axes of both the bonnet bore and stem bore. The swinging or pivotal motion shifts the center of the ball 30 transversely with respect to the axis of the valve seat. This, in combination with eccentric rotation of the ball, allows the ball to be tightly seated in a closed position against the valve seat. Once this has been accomplished, the bonnet flange 66 and the valve body 10 are drilled to receive a tightly fitted pin 76 which serves to locate the bonnet at the desired position. Then, the bolts $64_{a-d}$ are tightened. The valve may thereafter be opened and closed by rotating the stem 28 in relation to the thus fixed bonnet.

Figure 9:
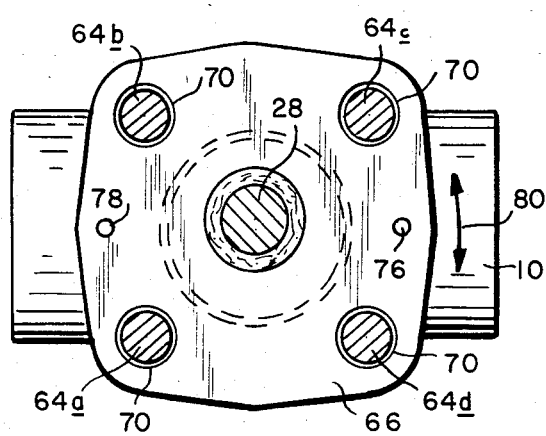
FIG. 9 is a view similar to FIG. 8 showing an alternative mode of pivotally adjusting the bonnet within the bonnet bore.

FIG. 9 is a view similar to that of FIG. 8, but depicting a slightly modified valve construction, where all of the bolts $64_{a-d}$ are received with clearances 70 in their respective bonnet flange holes and a pivot pin 78 is provided about which the bonnet is permitted to swing as schematically depicted by the arrow 80. The axis of the pivot pin is located externally of the bonnet bore, is perpendicular to and intersects the fluid bore axis, and is parallel to the axes of both the bonnet bore and stem bore. Once the ball is properly located against the seat, the bonnet flange 66 and valve body 10 are again drilled to receive the locating pin 76, and the bolts $64_{a-d}$ are tightened, all as previously described in connection with the construction of FIGS. 6-8.

Figure 10:
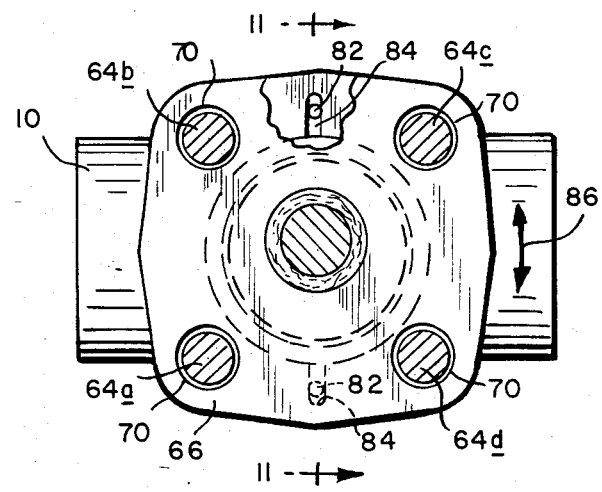
FIG. 10 is a view similar to FIGS. 8 and 9 wherein the bonnet is slidably adjustable within the bonnet bore.
Figure 11:
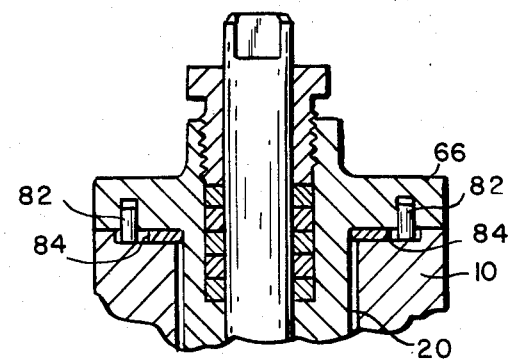
FIG. 11 is a partial sectional view taken along line 11—11 of FIG. 10.

FIGS. 10 and 11 show another arrangement for movably adjusting the position of the bonnet 20 during the assembly stage. Here, the bonnet flange 66 is provided with pins 82 received in guide slots 84 in the valve body. All of the bolts $64_{a-d}$ are again received with clearances 70 in their respective bonnet flange holes, thereby permitting the bonnet to be adjusted in the direction of arrow 86 prior to tightening the bolts when the ball is properly seated.

Figure 12:
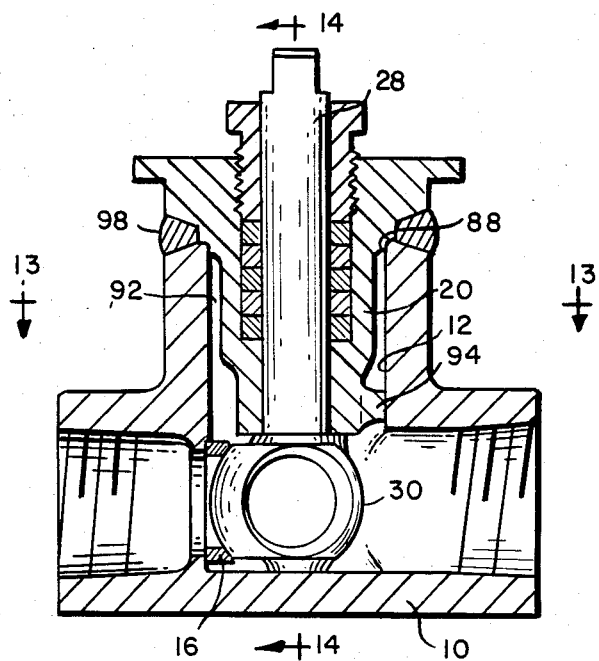
FIG. 12 is a vertical cross sectional view taken through still another embodiment of a valve in accordance with the present invention.
Figure 13:
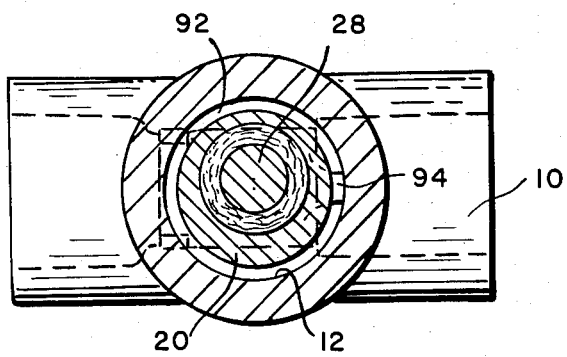
FIGS. 13 and 14 are sectional views taken respectively along lines 13—13 and 14—14 of FIG. 12.
Figure 14:
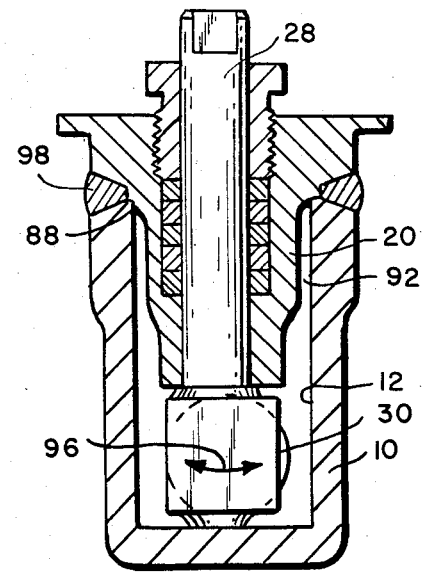

FIGS. 12-14 depict still another valve construction in accordance with the present invention where the bonnet 20 is provided with a short peripheral shoulder 88 which fits the upper end of the bonnet bore 12. Clearance 92 is provided between the bonnet and the wall of the bonnet bore below shoulder 88, except for a foot 94 on the lower end of the bonnet which is in contact with the bonnet bore opposite to the valve seat. During assembly of the valve components, the bonnet can tilt as schematically depicted by arrow 96 to act in concert with eccentric rotation of the ball 30 in achieving tight seating of the ball against the valve seat 16. In this case, the bonnet tilts about an axis which is transverse to the axes of the bonnet and stem bores, and generally parallel to the fluid bore axis. Once the ball has been properly seated, the bonnet is fixed in place by welding as at 98.

In light of the foregoing, it will now be appreciated by those skilled in the art that the present invention provides simple, inexpensive and effective means of achieving a precise seating of the ball against the valve seat. This objective is achieved by providing dual motion multi-direction adjustment of the ball with respect to the valve seat during the assembly stage. The bonnet is adjustable within the bonnet bore to move the axis of the stem bore as well as the stem rotatably received therein and the ball supported by the stem transversely with respect to the fluid bore axis, the latter being coincident with the axis of the valve seat, and the ball center is offset with respect to the rotational axis of the stem, thereby resulting in eccentric movement to the ball when the stem is turned. Once the ball is properly seated, the bonnet is fixed in place in the bonnet bore and the valve is thereafter opened and closed by eccentrically rotating the ball relative to the thus fixed bonnet.

I claim:

1. A ball valve comprising in combination: a valve body having a bonnet bore communicating with a through fluid bore; an unyielding valve seat fixed in said valve body at a location surrounding the axis of said fluid bore; a bonnet received in said bonnet bore, said bonnet having a stem bore extending therethrough; a stem journalled for rotation in said stem bore about an axis which remains coincident with the stem bore axis, said bonnet being adjustable within said bonnet bore to shift the coincident stem bore and stem rotational axes transversely with respect to the axis of said fluid bore; a ball in said fluid bore, said ball having a through passageway and being fixed to said stem for rotation therewith, the center of said ball being offset with respect to the rotational axis of said stem, whereupon by selected adjustment of said bonnet and rotation of said stem during initial assembly of said valve, said ball may be located in a closed position against said valve seat; and means for fixing said bonnet in said bonnet bore, whereupon said ball subsequently may be operated between said closed position and an open position aligning said through passageway with said fluid bore by rotating said stem in relation to the thus fixed bonnet.

2. The ball valve of claim 1 wherein said bonnet is pivotally adjustable within said bonnet bore.

3. The ball valve of claim 2 wherein said bonnet is adjustable about a pivot axis located externally of said bonnet bore and extending in a direction parallel to the axes of said bonnet bore and stem bore.

4. The ball valve of claim 3 wherein the means for fixing said bonnet in said bonnet bore comprises a plurality of bolts which extend through holes in said bonnet and which are threaded into said valve body, one of said bolts being snugly fitted in its respective hole to thereby define said pivot axis, and the remainder of said bolts being fitted with clearance in their respective holes, whereupon when said bolts are loosened said bonnet may be pivoted about said pivot axis, and tightening of said bolts causes said bonnet to be fixed.

5. The ball valve of claim 3 wherein said pivot axis intersects the axis of said fluid bore.

6. The ball valve of claim 3 wherein the means for fixing said bonnet in said bonnet bore comprises a plurality of bolts which extend through holes in said bonnet and which are threaded into said valve body, said bolts being fitted with clearance in their respective holes, and said pivot axis being defined by means other than said bolts, whereupon when said bolts are loosened said bonnet may be pivoted about said pivot axis, and tightening of said bolts causes said bonnet to be fixed.

7. The ball valve of claim 1 wherein said bonnet is adjustable along a straight line path.

8. The ball valve of claim 7 wherein said straight line path is defined by guide means acting independently of the means for fixing said bonnet in said bonnet bore.

9. The ball valve of claim 8 wherein said guide means is comprised of pin members on one of said bonnet or valve body received in slots in the other of said bonnet or valve body.

10. The ball valve of any one of claims 4, 6 or 7-9 further comprising means acting independently of the means for fixing said bonnet in said bonnet bore for locating said bonnet at a selected position relative to said valve body.

11. The ball valve of claim 2 wherein said bonnet is pivotally adjustable about an axis extending transversely with respect to the axis of said bonnet bore and stem bore and parallel to the fluid bore axis.

12. The ball valve of claim 1 wherein said bonnet is received with clearance within said bonnet bore.

* * * * *